(12) United States Patent
Bruner

(10) Patent No.: US 6,449,173 B1
(45) Date of Patent: Sep. 10, 2002

(54) ALTERNATING CURRENT TO DIRECT CURRENT DISTRIBUTOR

(75) Inventor: Robert William Bruner, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/703,232

(22) Filed: Oct. 31, 2000

(51) Int. Cl.[7] .............................. H02M 7/00; H02M 3/24
(52) U.S. Cl. .............................. 363/65; 363/70; 307/32; 307/82
(58) Field of Search .................... 363/65, 67, 69, 363/70; 307/31–35, 23, 82

(56) References Cited

U.S. PATENT DOCUMENTS 5,790,394 A   8/1998  Cabaniss et al. ............... 363/65
5,917,250 A   6/1999  Kakalec et al. ............... 307/18

*Primary Examiner*—Bao Q. Vu
(74) *Attorney, Agent, or Firm*—Jeff D. Limone

(57) ABSTRACT

A dual alternating current to direct current distributor includes separate alternating current inputs 5, 6. Each input is coupled to a rectifier (10, 11) which converts the alternating current to direct current. The output from each rectifier (10, 11) is fanned out along a plurality of parallel paths. Each path includes a current sensor (20–24), which indicates when a current flow is not present, and a diode (30–34) that prevents current flow in a opposite direction. A light emitting diode (50–59) provides an indication of a failure of a diode (30–34) or that a current is not flowing through a given current sensor (20–24). Each alternating current to direct current distributor is mounted in a chassis 500, with each chassis mounted to a carrier (600). Thus, each distributor can be removed without affecting the operation of the other.

21 Claims, 2 Drawing Sheets

ALTERNATING CURRENT TO DIRECT CURRENT DISTRIBUTOR

FIELD OF THE INVENTION

The invention relates to the field of electronics and, more particularly, alternating current to direct current conversion and distribution.

BACKGROUND OF THE INVENTION

In a telecommunication system, a major design concern is the ability of the system to remain functional during a variety of failures which may occur both internal and external to the system. One area of constant investigation is in the power conversion and power distribution portion of the telecommunication system. Although components used within the power conversion and power distribution circuits have become more and more reliable, typical power subsystems are still vulnerable to single point failures. In other words, although electronic components may achieve greater reliability, the possibility of single point failures still causes concern among telecommunication system designers.

As a partial remedy to the issue of single point failures, a dual source alternating current to direct current conversion and distribution equipment can be employed. However, this equipment does not generally permit the repair of major subsystem elements while other portions of the power subsystem are operating. Thus, when a critical failure related to one of the dual sources has occurred, operation of the entire power conversion and distribution subsystem must be suspended in order to make repairs to the failed portion of the subsystem. This can cause an unacceptable suspension in the telecommunications services that require stable and continuous flow of direct current power.

Therefore, it is highly desirable to employ an alternating current to direct current distributor that incorporates modular features that enable failures to be easily detected and repaired while still allowing communications services to be provided while the failed portion of the power distribution system is undergoing repair.

BRIEF DESCRIPTION OF THE DRAWINGS

The invention is pointed out with particularity in the appended claims. However, a more complete understanding of the invention may be derived by reading the specification herein in conjunction with the figures wherein like reference numbers refer to like components, and;

DETAILED DESCRIPTION OF THE DRAWINGS

An alternating current to direct current distributor provides a reliable and easily repairable means of providing power to a telecommunication system. The distributor can be operated in conjunction with at least one similar distributor in order to provide continuous direct current power when one of the distributors fails. The distributor can be packaged in a single chassis that continuously transmits fault information without the need for sophisticated electronics.

Figure 1:
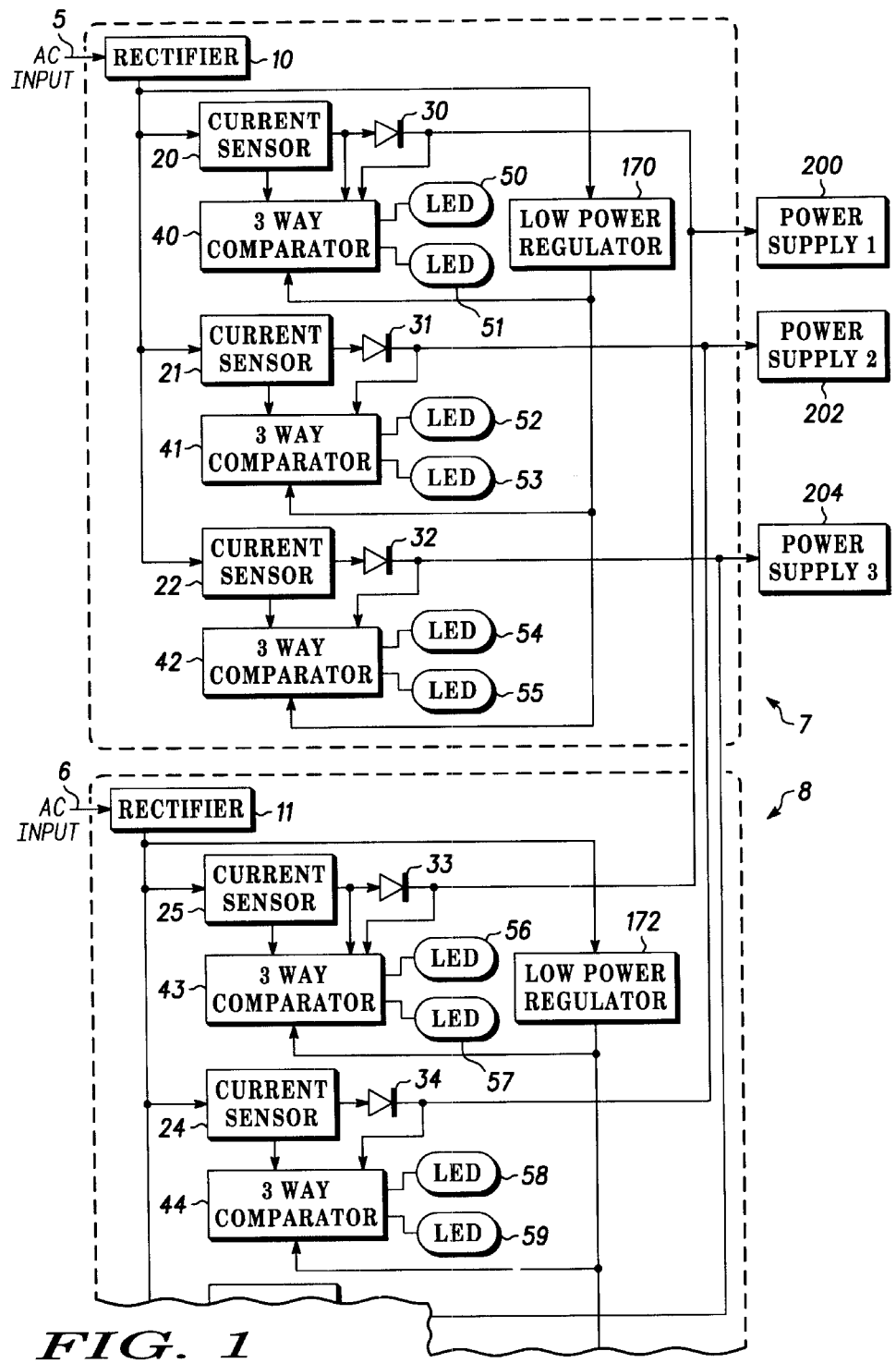
FIG. 1 is a block diagram of a dual source alternating current to direct current distributor in accordance with a preferred embodiment of the invention.

FIG. 1 is a block diagram of a dual source alternating current to direct current distributor in accordance with a preferred embodiment of the invention. In FIG. 1, two alternating current inputs 5, 6 are each coupled to one of rectifiers 10, 11. Preferably, the voltage level coupled to rectifier 10, 11 is between 90 and 270 volts, although this voltage range is intended to provide an illustration and is not intended to limit the invention. Additionally, it is anticipated that the inputs of each alternating current to direct current distributor 7, 8 is coupled to two separate input power grids. This allows the distributor of FIG. 1 to produce direct current power in the event of a failure in one of the input power grids.

Rectifiers 10, 11 of FIG. 1 are preferably bridge type rectifiers which convert the alternating current inputs to direct current power. Although bridge rectifiers are suggested in the example of FIG. 1, nothing prevents the use of a different type of means for coupling to an alternating current and means for converting the alternating current to a direct current. The outputs of each of rectifiers 10, 11 are coupled to a group of current sensors 20, 21, 22, 23, 24. In the example of FIG. 1 each of rectifiers 10, 11 is fanned out to three current sensors 20, 21, 22 in order to provide three parallel current paths; however, a greater or lesser number of fan outs from each of rectifiers 10, 11 is possible based on the needs of the particular application.

An output of each of current sensors 20–24 is influenced by the presence of a current flowing through each sensor. This output is conveyed to three-way comparator 40, 41, 42, 43, 44. Three-way comparator 40–44 compares the level of this output with a voltage-divided representation of the output of one of rectifiers 10, 11 in order to drive one of light emitting diodes 50–59. Thus, a normal current flow through each of current sensors 20–24 can be indicated by way of visually inspecting a corresponding one of light emitting diodes 50–59. Additional functions performed three-way comparator 46–44 are discussed in relation to FIG. 3.

In FIG. 1, a second output of each of current sensors 20–24 is conveyed through diodes 30–34 respectively to one of power supply loads 200, 202 and 204. In an alternate embodiment, diode 30–34 can be replaced by any other means for ensuring that current flows toward a load, and does not flow away from the load. Desirably, a small amount of current at the output side of rectifier 10, 11 is used by low-power regulator 170 to provide primary power to operate the active circuitry within three-way comparator 40–44. In FIG. 1, low-power regulator 170 provides an output voltage of a predetermined amount less than the voltage from rectifier 10, 11.

In the architecture of FIG. 1 it can be seen that both distributor modules can be active at any one time. Additionally, in the event of a failure of one module, the other module will not be affected. Further, either one of the two modules shown in FIG. 1 can be replaced without affecting the operating condition of the other. Although not shown in FIG. 1, light-emitting diodes 50–59 can be coupled radially to a single logic output. This logic output can be monitored by way of external equipment to provide a remote indication that a failure has occurred somewhere in the dual alternating current to direct current distributor if FIG. 1.

Figure 2:
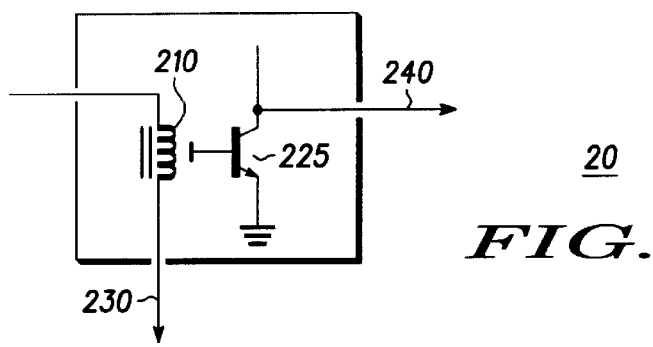
FIG. 2 shows additional details of the current sensor used in the alternating current to direct current distributor of FIG. 1 in accordance with a preferred embodiment of the invention.

FIG. 2 shows additional details of the current sensor 20–24 used in the alternating current to direct current distributor of FIG. 1 in accordance with a preferred embodiment of the invention. In FIG. 2, current sensor 20–24 provides a suitable circuit which can be used to bring about the desired functionality within the circuit environment of FIG. 1, although other means for sensing a direct current emanating from rectifier 10, 11 can be used. Current sensor 20–24 of FIG. 2 includes an inductor 210, and field effect device 225. Field effect device 225 can be a Hall effect device or other appropriate electronic device that changes an outputs state based on a magnetic field generated by a current flowing through a nearby inductor. In a preferred embodiment, a current flowing through inductor 210 to diode 30–34 of FIG. 1 causes field effect device 225 to transition from an inactive to an active state. This change of state is conveyed through output 240 of current sensor 20–24 to three-way comparator 40–44 of FIG. 1.

Figure 3:
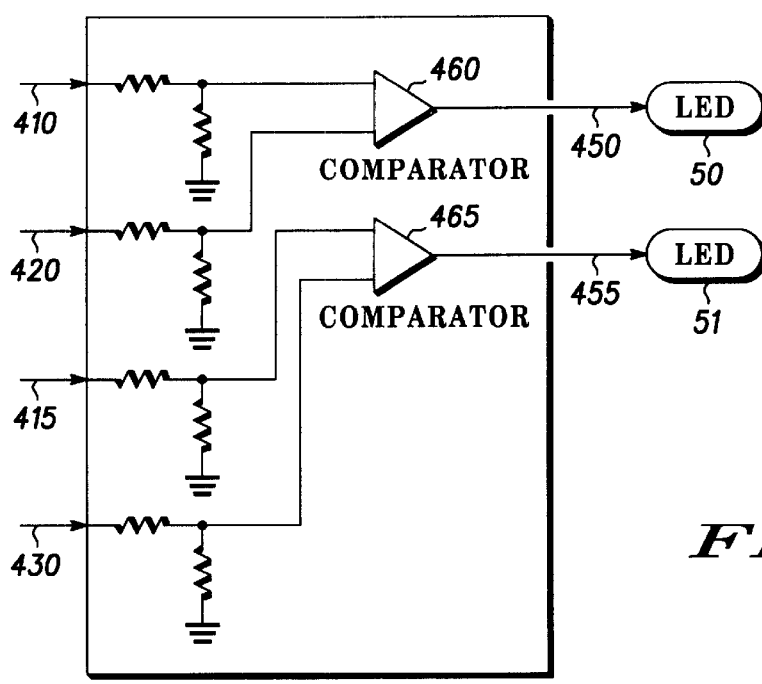
FIG. 3 is a three-way comparator used to detect and report failures in the output current path of the alternating current to direct current distributor of FIG. 1 in accordance with a preferred embodiment of the invention.

FIG. 3 is a three-way comparator 40–44 used to detect and report failures in the output current path of the alternating current to direct current distributor of FIG. 1 in accordance with a preferred embodiment of the invention. As an example of a preferred embodiment, in FIG. 3, input 410 represents an input to three-way comparator 40–44 from one of rectifiers 10, 11 of FIG. 1. This input provides a reference voltage for voltage comparator 460 of the three-way comparator. Input 420 represents a voltage-divided version of the output of current sensor 20–24 (of FIG. 1) to three-way comparator 40–44. Preferably, the state of input 420 changes when the amount of current flowing through current sensor 20–24 substantially changes. Thus, output 450 of voltage comparator 460 changes as a function of the relationship of inputs 410 and 420. This change controls the state of light-emitting diode 50 coupled to the output of voltage comparator 460.

The three-way comparator of FIG. 2 additionally includes input 430, which represents the output from diode 30 of FIG. 1. In FIG. 3, a voltage-divided representation of the voltage at the output of diode 30 is compared with input 415 which is a voltage-divided representation of the output of current sensor 20. Thus, output 455 of voltage comparator 465 changes as a function of the relationship of inputs 415 and 430. Desirably, voltage comparator 465 is triggered when the voltage across diode 30 indicates that the diode has shorted. This change controls the state of light-emitting diode 51 coupled to the output of voltage comparator 465.

In a preferred embodiment, light-emitting diodes 50–59 of FIGS. 1 and 3 are in an active state (i.e. light-emitting) under normal operating conditions. In the event that one of current sensors 20–24 does not indicate current flow, the corresponding one of light-emitting diodes 50–59 will not be illuminated. Additionally, in the event that one of diodes 30–34 has shorted (as determined by voltage comparator 465 of one of three-way comparators 40–44) the corresponding one of light-emitting diodes 50–59 will not be illuminated. Further, through the use of light-emitting diodes that are not illuminated under failure conditions, a failure within the diode itself can be noticed by maintenance personnel and attended to in an appropriate manner. Other means for indicating current flow and direction other light-emitting diodes 50–59 used so long as these other means can easily convey a failure status.

In an alternate embodiment, each of voltage comparators 460 and 465 is replaced by a pair of voltage comparators. By using two voltage comparators which operate in parallel, a single point failure can be avoided.

Figure 4:
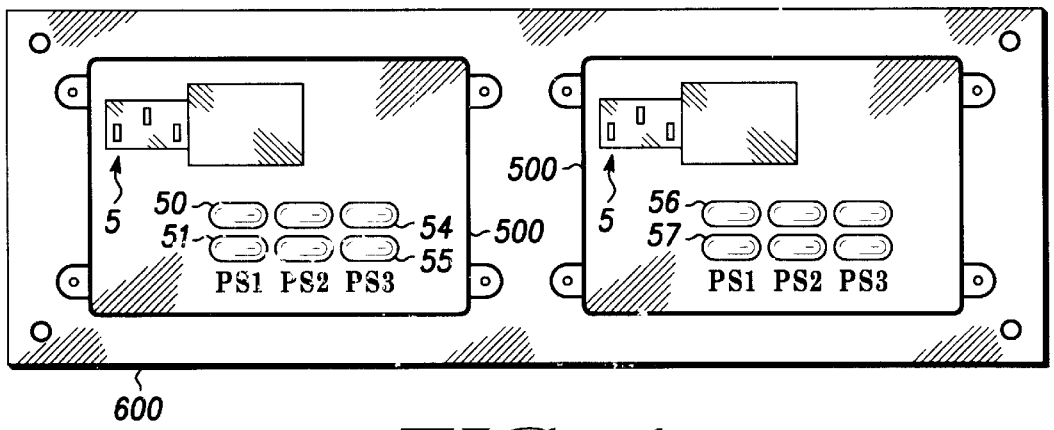
FIG. 4 is a view of the dual source alternating current to direct current distributor of FIG. 1 mounted on a carrier in accordance with a preferred embodiment of the invention.

FIG. 4 is a view of the dual source alternating current to direct current distributor of FIG. 1 mounted on a carrier in accordance with a preferred embodiment of the invention. In FIG. 4, the circuitry of each distributor FIG. 1 has been installed on chassis 500. Each of light-emitting diodes 50–59 can be seen on the face of each chassis. Additionally, alternating current input 5, 6 can be seen on the face of each of chassis 500 as well. Further, each of chassis 500 is mounted to carrier 600 by way of conventional means.

In conclusion, an alternating current to direct current distributor provides a reliable and easily repairable means of providing power to a telecommunication system. The distributor can be operated in conjunction with at least one similar distributor in order to provide continuous direct current power when one of the distributors fails. The distributor can be packaged in a single chassis that continuously transmits fault information without the need for sophisticated electronics. Accordingly, it is intended by the appended claims to cover all modifications of the invention that fall within the true spirit and scope of the invention.

What is claimed is:

1. A dual source alternating current to direct current distributor comprising:
    an alternating current input;
    a rectifier, wherein an input of said rectifier is coupled to said alternating current input, and wherein an output of said rectifier is direct current;
    a current sensor coupled to an output of said rectifier;
    a diode coupled to an output of said current sensor;
    a first comparator coupled to said current sensor, wherein an output of said first comparator is influenced by a current flowing through said current sensor;
    a second comparator coupled to said diode, wherein an output of said second comparator is influenced by said current flowing through said diode;
    a chassis which accepts said rectifier, said current sensor, said diode, said first and second comparator; and
    a carrier which accepts a first and second of said chassis and permits removal of either said first or second chassis without affecting an operation of a remaining chassis.

2. The dual source alternating current to direct current distributor of claim 1, wherein said current sensor comprises an inductor having an input coupled to an output of said rectifier.

3. The dual source alternating current to direct current distributor of claim 2, wherein an output of said current sensor is influenced by a magnetic field generated by a current flowing through said inductor.

4. The dual source alternating current to direct current distributor of claim 3, wherein said current sensor further comprises a Hall effect device, said Hall effect device being activated by a magnetic field generated by said current flowing through said inductor.

5. The dual source alternating current to direct current distributor of claim 1, wherein an output of said first comparator is coupled to an indicator which changes state when said current flowing through said current sensor substantially changes.

6. The dual source alternating current to direct current distributor of claim 1, wherein an output of said second comparator is coupled to an indicator which changes state when a voltage across indicated that said diode has shorted.

7. The dual source alternating current to direct current distributor of claim 6, additionally comprising an output, wherein a state of said output is determined by a change in an output of any of said first or second comparators.

8. The dual source alternating current to direct current distributor of claim 1, additionally comprising a low power regulator having an input coupled to an output of said rectifier and an output which is a predetermined voltage less than a voltage level of said output of said rectifier.

9. A dual source alternating current to direct current distributor comprising:

means for coupling to an alternating current;

means for converting said alternating current to a direct current, said means for converting being coupled to an output of said means for coupling;

means for sensing a direct current emanating from said means for converting;

means for ensuring that said direct current flows toward a load and does not flow from said load, said means for ensuring being coupled to said means for sensing a direct current;

means for indicating that said direct current is emanating from said means for converting;

means for indicating that said direct current is flowing toward said load and does not flow from said load;

means for mounting said means for coupling, said means for converting, said means for sensing, said means for ensuring, and said first and second means for indicating to a chassis; and means for accepting a first and second means for mounting on a carrier and removing either said first or second means for mounting without affecting an operation of a remaining means for mounting.

10. The dual source alternating current to direct current distributor of claim 9 wherein said means for sensing a direct current emanating from said means for converting comprises an inductor coupled to a Hall effect device.

11. The dual source alternating current to direct current distributor of claim 9, further comprising means for converting an amount of said direct current to a smaller amount in order to provide power to the means for indicating.

12. In a dual source alternating current to direct current distributor, a method for reporting a failure of said alternating current to direct current distributor, comprising:

rectifying said alternating current to produce a plurality of direct currents;

determining that said plurality of direct currents are flowing through a corresponding one of a plurality of current sensors;

determining that a voltage drop across a corresponding one of a plurality of diodes is present;

influencing a state of an indicator in the event that any one of said plurality of direct currents substantially decreases or that said nominal voltage drop across one of said plurality of diodes is not present; and reporting that a failure has occurred.

13. The method of claim 12, wherein said first determining step is performed by an inductor coupled to a Hall effect device.

14. An alternating current to direct current distributor comprising:

a bridge rectifier, wherein an input of said bridge rectifier is coupled to an alternating current input, and wherein an output of said bridge rectifier is a direct current;

a current sensor coupled to an output of said bridge rectifier;

a diode coupled to an output of said current sensor;

a first pair of comparators each coupled to said current sensor, wherein an output of said first pair of comparators is influenced by a current flowing through said current sensor; and a second pair of comparators each coupled to said diode, wherein an output of said second pair of comparators is influenced by said current flowing through said diode.

15. The alternating current to direct current distributor of claim 14, wherein said current sensor comprises an inductor having an input coupled to said bridge rectifier and having an output coupled to said first pair of comparators.

16. The alternating current to direct current distributor of claim 14, wherein an output of said current sensor is influenced by a magnetic field generated by said current.

17. The alternating current to direct current distributor of claim 16, wherein said current sensor is an inductor placed proximate with a Hall effect device, said Hall effect device being activated by a magnetic field generated by said current flowing in said inductor.

18. The alternating current to direct current distributor of claim 14, wherein an output of said first pair of comparators is coupled to at least one indicator which changes state when said current flowing through said current sensor substantially changes.

19. The alternating current to direct current distributor of claim 14, wherein an output of said second pair of comparators is coupled to at least one indicator which changes state when said current flowing through said diode substantially changes.

20. The alternating current to direct current distributor of claim 14, additionally comprising an indicator having an output which is influenced by a change in said output of either said first or second pair of comparators.

21. The alternating current to direct current distributor of claim 14, additionally comprising a low power regulator having an input coupled to an output of said bridge rectifier and an output which is a predetermined voltage less than a voltage level of said output of said bridge rectifier.

* * * * *